US008139653B2

(12) United States Patent
Chang

(10) Patent No.: US 8,139,653 B2
(45) Date of Patent: Mar. 20, 2012

(54) MULTI-CHANNEL GALVANIC ISOLATOR UTILIZING A SINGLE TRANSMISSION CHANNEL

(75) Inventor: Kwee Chong Chang, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1029 days.

(21) Appl. No.: 11/675,370

(22) Filed: Feb. 15, 2007

(65) Prior Publication Data

US 2008/0198904 A1 Aug. 21, 2008

(51) Int. Cl.
*H04L 27/00* (2006.01)

(52) U.S. Cl. ........ 375/259; 375/282; 375/333; 375/361; 341/70

(58) Field of Classification Search .................. 375/259, 375/282, 333, 361; 341/70
See application file for complete search history.

(56) References Cited

U.S. PATENT DOCUMENTS 4,063,220 A * 12/1977 Metcalfe et al. .............. 370/462
5,054,060 A * 10/1991 Werdin et al. ................. 379/324
5,384,808 A * 1/1995 Van Brunt et al. ............ 375/257
5,465,268 A * 11/1995 Rainbolt ....................... 375/333
6,222,380 B1 * 4/2001 Gerowitz et al. ............... 326/38
6,381,270 B1 * 4/2002 Lydon et al. .................. 375/230
2006/0092322 A1 * 5/2006 Umesako ...................... 348/515
2006/0221806 A1 * 10/2006 Kondo et al. .............. 369/275.3

* cited by examiner

*Primary Examiner* — Chieh M. Fan
*Assistant Examiner* — Leila Malek

(57) ABSTRACT

A galvanic isolator having a transmitting section and a receiving section is disclosed. The transmitting section includes a frame input circuit, a data encoder, and a data transmitter. The frame input circuit receives an input data frame that includes a plurality of input binary bits. The data encoder encodes the input binary bits to generate an encoded data frame that includes a sequence of encoded binary bits in which two successive encoded binary bits represent each input binary bit. The successive encoded binary bits representing a 1 are 01 or 10, and the successive encoded binary bits representing a 0 are 00 or 11. The sequences are chosen to maximize the number of transitions in the encoded data frame. A data receiver recovers the encoded data frame by examining successive pairs of encoded data bits using a clock that is reset on the edges in the encoded data frame.

19 Claims, 5 Drawing Sheets

MULTI-CHANNEL GALVANIC ISOLATOR UTILIZING A SINGLE TRANSMISSION CHANNEL

BACKGROUND OF THE INVENTION

In many circuit arrangements, a logic signal must be transmitted between two circuits that must otherwise be electrically isolated from one another. For example, the transmitting circuit could utilize high internal voltages that would present a hazard to the receiving circuit or individuals in contact with that circuit. In the more general case, the isolating circuit must provide both voltage and noise isolation across an insulating barrier. Such isolation circuits are often referred to as "galvanic isolators". One class of galvanic isolators is based on transforming the logic signal to a light signal that is then transmitted to an optical receiver in the receiving circuit that converts the optical signal back to an electrical signal.

Galvanic isolators based on one or more electrical transducers have also been developed. One example is an opto-coupler. In these galvanic isolators, the transmitter drives the LED to generate a light signal that is received by an optical receiver that is located on the other side of the isolation barrier. Typically, the transmitter and the LED are constructed together while the receiver and optical receiver are constructed on a separate chip.

In a number of applications of interest, multiple logic signals must be transmitted across the isolation barrier. In principle, a separate galvanic isolator could be used for each signal. However, the cost of the galvanic isolators is a significant issue in many of these applications. In addition, the space required for the multiple isolators on the printed circuit boards is also a problem in some applications.

In principle, the individual data streams could be combined to provide a single data stream in which the data is time-domain multiplexed and sent over a single isolation channel. In such schemes, the various data streams are received on separate lines of an input circuit that samples the individual lines at a predetermined rate. The sampled values are combined into a digital "frame" having one slot for each data stream. The frame is then sent as a data packet over the isolation channel. At the receiving end, the frame is unpacked and the sampled values are placed on the individual data output lines.

For this strategy to function, the input circuit needs to recognize the beginning of a data packet. Hence, some form of unique sequence of signals must be provided to mark the beginning of a data packet. The costs associated with providing the start signal across the isolation barrier are prohibitive in some applications. In addition, the receiver must have some form of clock that is sufficiently synchronized with the clock in the transmitter to allow the receiver to determine where the data bits in the frame begin and end. The cost of providing high precision clocks in both the transmitter and receiver is also a problem in some applications.

SUMMARY OF THE INVENTION

The present invention includes a galvanic isolator having a transmitting section and a receiving section. The transmitting section includes a frame input circuit, a data encoder, and a data transmitter. The frame input circuit receives an input data frame that includes a plurality of input binary bits. The data encoder encodes the input binary bits to generate an encoded data frame that includes a sequence of encoded binary bits in which two successive encoded binary bits represent each input binary bit. The successive encoded binary bits representing a 1 are 01 or 10, and the successive encoded binary bits representing a 0 are 00 or 11. The sequences are chosen to maximize the number of transitions between successive bits having opposite values in the encoded data frame. The data transmitter transmits the encoded data frame across an isolation gap that electrically isolates the transmitting section and the receiving section. The receiving section includes a data receiver that recovers the encoded data frame transmitted by a data transmitter and a data decoder. The data decoder examines successive pairs of recovered encoded data bits and generates a recovered output data bit from each of the successive pair of encoded data bits. In one aspect of the invention, the encoded data frame begins with a start frame signal that includes 0000 or 1111. The start frame signal is chosen based on an encoded data bit in a previously transmitted encoded data frame. In another aspect of the invention, the data decoder includes a clock that is reset each time a pair of encoded binary bits corresponding to an input binary bit is received by the data decoder.

DETAILED DESCRIPTION OF THE PREFERRED EMBODIMENTS OF THE INVENTION

Figure 1:
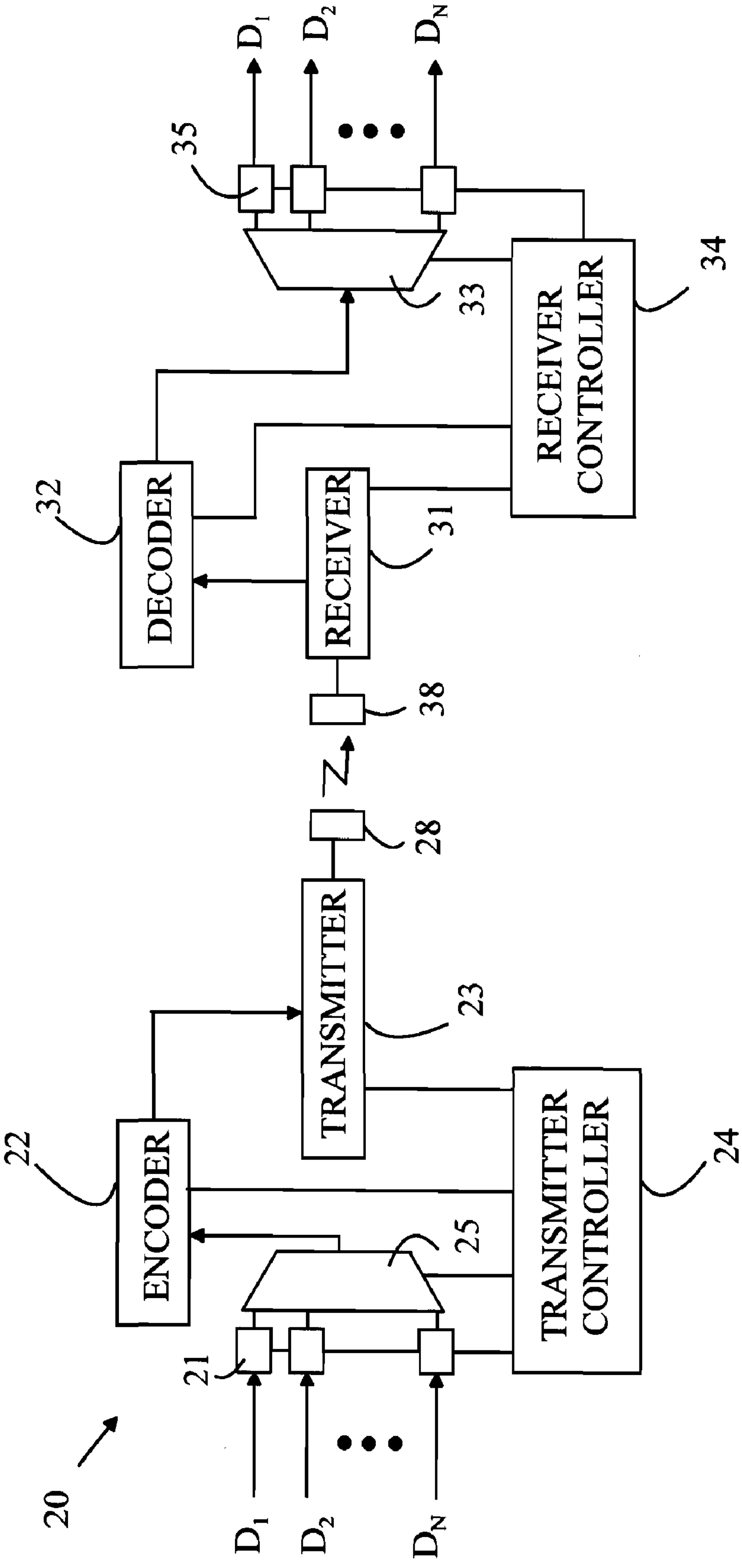
FIG. 1 illustrates one embodiment of a galvanic isolator according to the present invention.

The manner in which the present invention provides its advantages can be more easily understood with reference to FIG. 1, which illustrates one embodiment of a galvanic isolator according to the present invention. Galvanic isolator 20 receives signals from N input lines that are connected to a multiplexer 25 via a set of latches such as latch 21. Each latch captures the logic level on the corresponding data line in response to a sampling signal from transmitter controller 24. Hence, all of the input data lines are effectively sampled at the same time.

The data stored in the latches is sequentially input into encoder 22, which encodes each bit using an algorithm that will be discussed in more detail below. A clock in transmitter controller 24 is used to define a transmit cycle during which each of the encoded data bits is sent via transmitter 23. The output of encoder 22 is a first serial data signal that switches between high and low signal levels.

A receiver 31 on the other side of the isolation link receives the signal and outputs a second serial data signal that is decoded by decoder 32 to form a decoded data stream that is demultiplexed into the output latches shown at 35 by demultiplexer 33. After all of the output latches have been loaded, receiver controller 34 connects the data to the output lines so that the output data lines are updated at the same time.

The isolation link formed by transmitter 23 and receiver 31 can be based on any suitable communication link including an optical link or an RF link. In addition, links based on capacitive or inductive coupling could also be utilized. In the case of a capacitive coupler, one plate of a capacitor is powered by the transmitter and the other plate is connected to the receiver, the data being transmitted by changes in the electric field between the plates. An inductive link is analogous to the transformer-based links discussed above. In this case, the data is transmitted by changes in the magnetic field that couples the two inductors that makeup the primary and secondary coils of the transformer. In general, the communication link consists of field transmitter 28 that sends the encoded data as a modulated field that is received by a field receiver 38. The field transmitter and field receiver can be viewed as a split circuit element in which one half of the element is included in the transmitter, and the other half is included in the receiver. In the case of an optical link, the first half is a light source, and the second half is a photodetector. In the case of an RF link, the first half is an RF modulator and antenna, and the second half includes an RF antenna and receiver that strips the carrier from the received signal.

Transmitter controller 24 includes a clock that is used to sample and send the encoded data signals. In principle, receiver controller 34 could also include a clock that was synchronized to the transmitter clock. Systems for recovering the clock signals from strings of binary encoded data are known in the art. However, the cost of implementing these schemes is prohibitive for many applications of interest. In addition, providing a high accuracy clock in either the transmitter or receiver is cost prohibitive in many applications. Hence, the coding scheme must allow the receiver to identify the beginning of a packet having the encoded data for each of the input lines and to provide timing information within the packet using inexpensive circuitry even when the transmitter clock has relatively low precision. Such circuitry has only limited accuracy, and hence, the coding scheme must provide sufficient transitions to re-synchronize the timers in the receiver. In addition, the packet header signal must be a pattern that cannot occur during a frame.

For the purposes of this discussion, the time period over which one bit of data is sent will be denoted by T. Transmitter controller 24 includes a clock that defines this time period. It is assumed that decoder 32 includes timers that define periods related to T; however, the accuracy of these timers is limited; hence, the decoding scheme must be capable of decoding the data stream using timers of limited accuracy. In one embodiment of the present invention, the timers are only used to define time periods of less than 1.25T relative to a transition in the incoming data stream. The encoding algorithm is chosen such that each bit includes at least one transition between the high and low states and each data packet begins with a transition between these states. Hence, by resetting the timers on predetermined edges in the input data stream, sufficient timing accuracy to decode the data can be maintained over the data packet using timers of limited accuracy in the receiver and a clock of limited accuracy in the transmitter.

The encoding algorithm used in one embodiment of the present invention will now be explained in more detail. Encoder 22 receives a serialized data stream and outputs an encoded data stream. For the purposes of this discussion, it will be assumed that the serialized data stream and the encoded data stream transitions between a high state corresponding to a logical "1" and a low state corresponding to a logical "0". When a new bit in the serialized data stream is received, encoder 22 changes the state of the encoded signal to the opposite state independent of whether or not the received bit was a 1 or a 0. Hence, if prior to receiving the new bit the encoded signal was a 1, the encoded signal is switched to a 0, and vice versa. After a time period 0.5 T has elapsed, the encoded signal will be switched to the opposite state for the remainder of the time period if the received bit was a 1. However, if the received bit was a 0, the encoded signal will continue at its previous state for the remainder of the time period. The next bit in the serialized data stream is received at the end of the current time period, and the process is repeated. Hence, every bit in the encoded data stream begins with a transition between the two logic states. If the encoded bit is a one, the encoded data stream will have an additional transition between the logic states half way through the time period.

In one embodiment, the packet start signal consists of two time periods during which the encoded signal remains at the low logic state or the high logic state. Since the portion of the encoded data stream that corresponds to the serialized data always has a transition at least once in every time period, this pattern cannot be generated by any sequence of data bits, and hence, the start of the packet is easily recognized.

Figure 2:
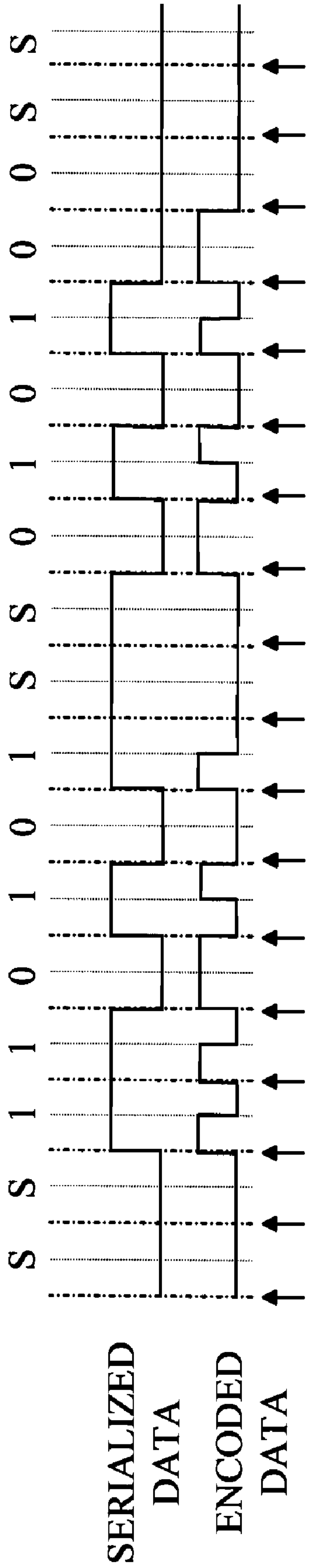
FIG. 2 illustrates an exemplary serialized data stream for the case in which N=6 and the corresponding encoded data stream.

Refer now to FIG. 2, which illustrates an exemplary serialized data stream for the case in which N=6 and the corresponding encoded data stream generated therefrom. Initially, the encoded data stream is in the low data state for two time periods. Since each bit of data starts with a transition to the opposite logic state, the start of the data in the packet is easily recognized as the first transition after the two time periods at the low logic state. In the example shown in FIG. 2, the first data packet consists of the sequence 110101, and the second data packet consists of the sequence 010100. The encoded data stream corresponding to the 1's includes a second transition between the logic states at times corresponding to one half of the transmission period. The start of each new time period in the encoded data stream is marked by an arrow in FIG. 2. Transitions half of the way between the arrows signify that the bit is a 1, while time periods that lack such transitions signify that the bit is a zero.

The decoder only needs to examine the encoded data stream in a window that is less than T in length that is opened after each time period starts. To provide sufficient tolerance, the preferred window length is 0.75T. The decoded bit corresponding to the current time period is initially set to a 0 and the window is generated starting from the edge that marks the time period in question. The window is delayed sufficiently to assure that the remainder of the triggering edge does not fall within the window. If a transition is detected during the window, the bit is set to a 1.

In one embodiment of the present invention, the decoder utilizes a signal $S_1$ and two simple signal generators to decode the encoded data stream. The signal switches between high and low states. For the purposes of this discussion, it will be assumed that $S_1$ is normally high unless it is temporarily set to the low state for a predetermined period of time. Denote the encoded data stream received by decoder 32 shown in FIG. 1 by $R_x$. This data stream is assumed to be a logic signal that switches between a high and a low state. If the transmitter and receiver utilize any form of carrier in the transmission of the encoded data signal from encoder 22 across the isolation gap, this carrier will have been removed before $R_x$ is sent to decoder 32.

Figure 3:
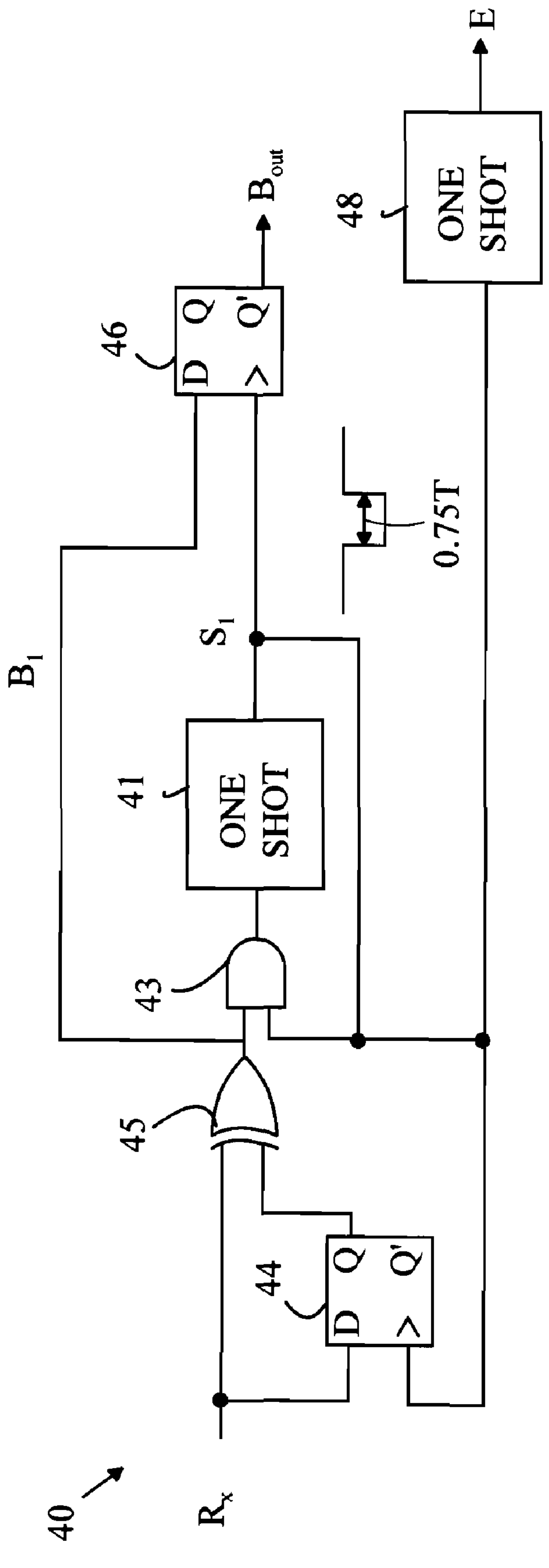
FIG. 3 is a schematic drawing of a circuit that generates two signals utilized in decoding the encoded data signal.

Refer now to FIG. 3, which is a schematic drawing of a circuit that generates two signals utilized in decoding the encoded data signal. Circuit 40 utilizes an edge triggered one-shot 41 whose output is normally high to generate $S_1$. The input to one-shot 41 is disabled by gate 43 when $S_1$ is low. The length of the output pulse from one-shot 41 is set to be 0.75T. Hence, when an edge is present in $R_x$ and $S_1$ is high, one-shot 41 resets $S_1$ to the low state for the first time period each time a transition is encountered in the encoded signal and $S_1$ is in the high state. At the end of the first time period, $S_1$ returns to the high state.

As will be explained in more detail below, when the first encoded bit of a packet arrives, $S_1$ will be in the high state. Hence, the first edge in the encoded bit triggers one-shot 41 and $S_1$ is set to the low state for 0.75T. $S_1$ cannot be reset during this time interval by an internal edge in the encoded bit, since triggering of one-shot 41 is blocked by gate 43. When the time period expires, $S_1$ returns to the high state, and will remain at the high state for the remaining 0.25T of the encoded bit signal. Thus, when the leading edge of the next encoded bit is received, a new 0.75T time period in which $S_1$ is low will be initiated, and so on. It should be noted that the start of a bit is signaled by a negative edge in $S_1$, and the end of the decoding operation for the current bit corresponds to the next positive going edge in $S_1$.

If the current encoded bit corresponds to a 1, there will be an edge in $R_x$ at 0.5T. If the current encoded bit corresponds to a 0, no such edge will be present. The decoding of the encoded bit is performed with the aid of edge Flipflops 44 and 46 and gate 45. Flipflop 44 latches a signal from $R_x$ at every 0.75T window when $S_1$ goes from low to high. This signal is XORed with $R_x$ by gate 45 to produce signal B. Signal $B_1$ will have a duty cycle of 50% if the encoded bit corresponds to a 1 and 75% if the encoded bit corresponds to a 0.

Flipflop 46 uses $S_1$ and $B_1$ to latch a 1 or 0 corresponding to the encoded bit 1 or 0 respectively. For an encoded bit equal to 1, $B_1$ will have a duty cycle of 50% and $S_1$ will have a duty cycle of 75%. During the low to high transition of $S_1$, flipflop 46 receives a 0 at $B_1$ and a 1 is latched at output Q'. For an encoded bit 0, $B_1$ and $S_1$ will have a duty cycle of 75%. During the low to high transition of $S_1$, flipflop 46 receives a 1 at Bland a 0 is latched at output Q'.

To provide continuity in the output signals when no change of state has occurred in the input signals, it is useful to have a one-bit register in the decoder that stores the results for the current bit. If the decoded value for the current bit is the same as that in the output latch for the corresponding output data line, the data line need not be updated, and hence, the signal level on that data line need not be altered. In the embodiment shown in FIG. 3, the one bit memory 46 is constructed. Hence, at the beginning of each encoded bit, Flipflop 46 stores a 0. If the encoded bit is a one, Flipflop 46 is set to store a 1 by $B_1$. The end of the processing for the current bit can be signaled by a one shot 48 that is triggered from a positive going edge.

Figure 4:
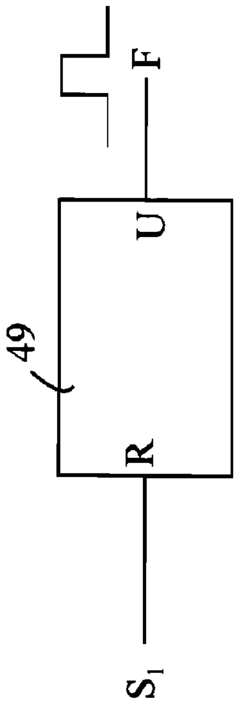
FIG. 4 illustrates one embodiment of a start frame signal generator.

The decoding process requires one additional signal to operate, namely, a beginning of frame signal. As noted above, the start of a frame is marked by a time period of length 2T in which no transitions occur. For each encoded bit in $R_x$, $S_1$ switches to the low state for 0.75T and returns to the high state for the remaining 0.25T of the time period for that bit. Hence, $S_1$ will be high for 2.25T before the transition corresponding to the first bit of the next frame. Hence, if $S_1$ remains high for more than T, the start frame signal in $R_x$ must have been encountered. In one embodiment of the present invention, a start frame signal is generated when $S_1$ is high for longer than 1.25T. Refer now to FIG. 4, which illustrates one embodiment of a start frame signal generator. Signal generator 49 includes a timer that is reset by edges in $S_1$. Each time an edge is received, the timer is set to 1.25T and begins to "count down". If another edge is received before the counter reaches 0, the counter is reset to 1.25T, but no output signal is generated. If the counter reaches 0, a signal F is generated.

Figure 5:
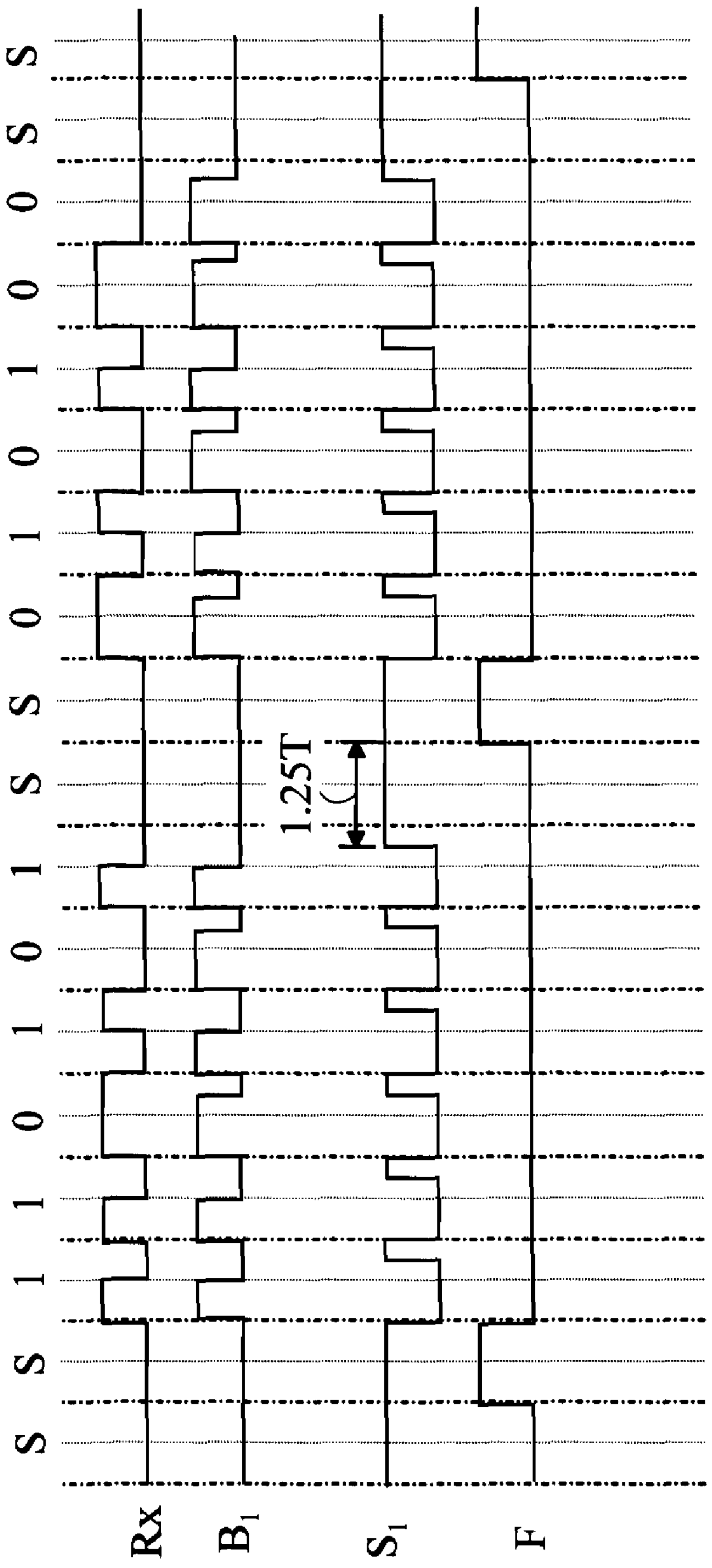
FIG. 5 illustrates the various signals discussed above for the case of the two frames of encoded data shown in FIG. 2.

Refer now to FIG. 5, which illustrates the various signals discussed above for the case of the two frames of encoded data shown in FIG. 2. The signal F is high during the time period of one encoded bit just prior to the receipt of the first encoded bit in the encoded data stream $R_x$. Each encoded bit starts with a leading edge that causes $S_1$ to transition to the low state for 0.75T and then return to the high state for 0.25T before being reset to the low state by the next bit. The signal $B_1$ is generated with the duty cycle of 50% corresponding to is in the original data and a duty cycle of 75% corresponding to 1s in the original data.

Figure 6:
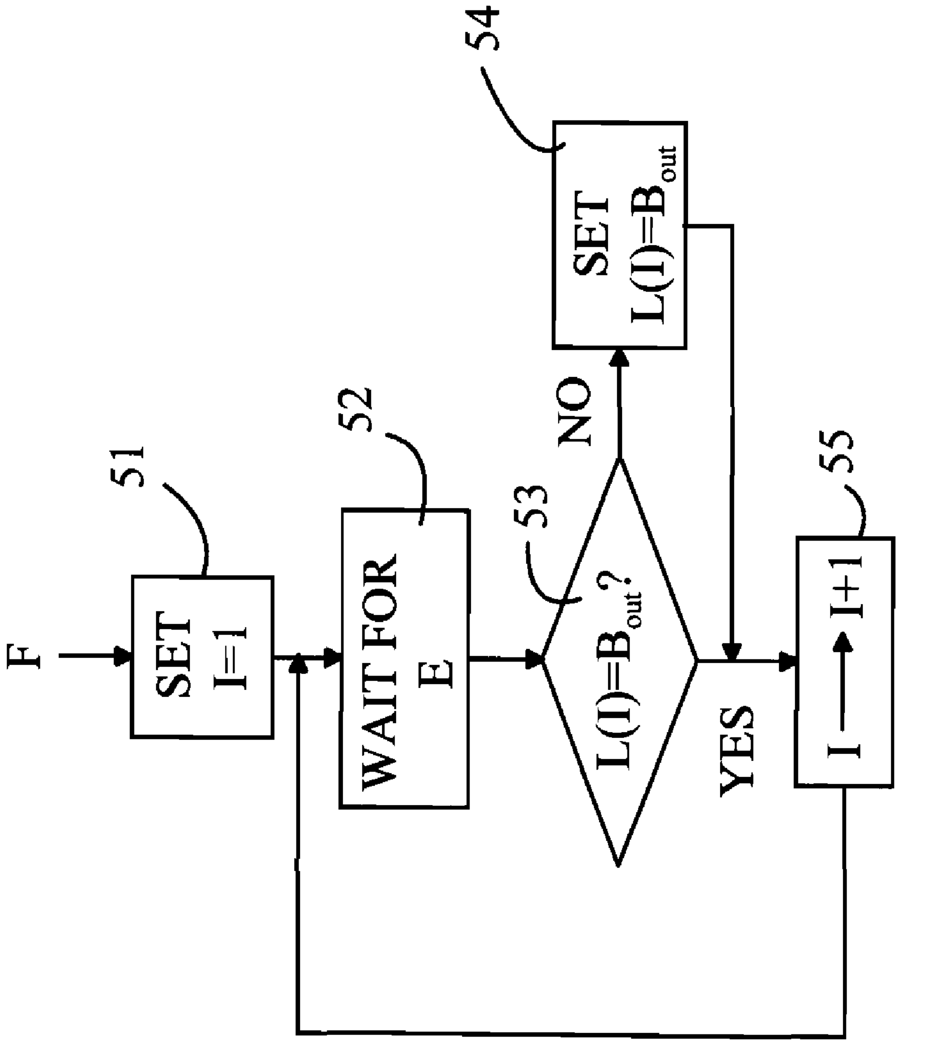
FIG. 6 is a flow chart of a decoding algorithm that can be utilized with the present invention.

Refer now to FIG. 6, which is a flow chart of a decoding algorithm that can be utilized with the present invention. The code block is entered each time signal F is generated. Initially, a counter, I, that determines the current encoding bit is set to 1 as shown at 51. The decoding controller than waits for signal E indicating that the decoding of the current bit has been completed as shown at 52. The controller then compares the current contents of the $I^{th}$ output latch, L(I) with the decoded bit value, $B_{out}$ as shown at 53. If the value has changed, the $I^{th}$ latch is updated with the value $B_{out}$ as shown at 54. If the value has not changed, the current contents of the $I^{th}$ latch are not altered, and hence, the signal level on the corresponding data line remains unchanged. Next, the current bit counter is incremented as shown at 55, and the controller returns to the state in which the controller waits for the end of the processing of the next bit.

The above-described embodiments of the present invention operate on the signal levels on a plurality of input lines to generate an input frame that is sent by a single isolation link to a receiver that decodes the encoded frame and places the resulting signal levels on a corresponding set of output data lines. However, the present invention can be utilized with any set of digital values to transmit those values to an isolated receiver. In such an embodiment, the data is already assumed to be organized as an input frame, and hence, the latches are not needed at the transmitter side of the data link provided the data can be shifted into the encoder and transmitted as fast as the data is received. If storage of the input frame is required, a shift register or other form of memory could be utilized at the input side of the data link. In this regard, it should be noted that the combination of the latches shown at 21 in FIG. 1 and multiplexer 25 perform a function equivalent to that of a shift register.

The above-described embodiments of the present invention are specific implementations of an encoding scheme in which each bit in the input data is encoded as a sequence of two bits in the encoded data stream that is transmitted across the isolation link. In this scheme, a 1 in the data stream is encoded either as the sequence 01 or the sequence 10 depending on the last encoded bit of the previously encoded data bit. If the previously encoded data ended in a 1, the first sequence is used; if the previously encoded data ended in a 0, the second sequence is used. Similarly, a 0 in the data stream is encoded either as the sequence 00 or the sequence 11 in the encoded data stream depending on the last encoded bit of the previously encoded data bit. If the previously encoded data ended in a 1, the first sequence is used; if the previously encoded data ended in a 0, the second sequence is used. Finally, the frame start signal is encoded either as the sequence 0000 or the sequence 1111 depending on the last encoded bit of the previously encoded data bit. If the previously encoded data ended in a 0, the first sequence is used; if the previously encoded data ended in a 1, the second sequence is used.

The data is decoded by examining two bit sequences in the encoded data stream and setting the decoded data value to a 1 if the bits are different and to a 0 if the bits are the same. By utilizing this encoding scheme, the clock in the encoder is resynchronized at least once every two bits in the encoded data sequence, and hence, a clock of limited accuracy can be utilized. It should be noted that the start sequence detector need only examine two bits and the previous encoded bit value to detect the start of a frame. A start of a frame occurred if the previous bit in the encoded data stream was a 0 and the current two bits are also 0 or if the previous bit in the encoded data stream was a 1 and the current two bits are 1.

In terms of this general encoding scheme, each bit in the encoded data stream occupies 0.5T. The signal $S_1$ discussed above can be viewed as a clock signal that is reset every two bits in the encoded data stream. The circuit that generates $B_1$ examines two successive bits in the encoded data stream to determine if the values are equal. The circuit that generates F examines three successive bits in the encoded data stream to determine if the bits are all the same.

Various modifications to the present invention will become apparent to those skilled in the art from the foregoing description and accompanying drawings. Accordingly, the present invention is to be limited solely by the scope of the following claims.

What is claimed is:

1. A galvanic isolator comprising:

a transmitting section and a receiving section, the transmitting section comprising:

a frame input circuit that receives an input data frame comprising a plurality of input binary bits;

a data encoder that receives the input binary bits from the frame input circuit and encodes the input binary bits to generate an encoded data frame comprising a sequence of encoded binary bits in which two successive encoded binary bits represent each input binary bit, the successive encoded binary bits representing a 1 being 01 or 10 and the successive encoded binary bits representing a 0 being 00 or 11, wherein the sequences are chosen to maximize the number of transitions between successive bits having opposite values in the encoded data frame; and a data transmitter that transmits the encoded data frame across an isolation gap that electrically isolates the transmitting section and the receiving section; and the receiving section comprising:

a data receiver that recovers the encoded data frame transmitted by the data transmitter; and a data decoder that examines successive pairs of recovered encoded data bits and generates a recovered output data bit from each of the successive pair of encoded data bits, the data decoder further comprising a first flipflop and a second flipflop, the first flipflop being connected to the second flipflop by at least one XOR gate and a one-shot, where the second flipflop directly receives an output of the at least one XOR gate and an output of the one-shot at its inputs;

and wherein the data transmitter comprises one element of a split circuit element and the data receiver comprises a second element of the split circuit element, and wherein the split circuit element comprises a transformer having a primary coil in the transmitting section and a secondary coil in the data receiving section.

2. The galvanic isolator of claim 1 wherein the encoded data frame begins with a start frame signal comprising 0000 or 1111.

3. The galvanic isolator of claim 1 wherein the sequence of the start frame signal is chosen based on an encoded data bit in a previously transmitted encoded data frame.

4. The galvanic isolator of claim 1 wherein the encoded data frame comprises an ordered sequence of the encoded binary bits in which each encoded data bit corresponding to one of the input binary bits is immediately preceded by a previously encoded data bit and wherein the sequence of encoded binary bits representing a 1 is 01 if the previously encoded binary bit in the encoded data frame is a 1 and the sequence of binary bits representing a 1 is 10 if the previously encoded binary bit in the encoded data frame is a 0.

5. The galvanic isolator of claim 4 wherein the sequence of encoded binary bits representing a 0 is 00 if the previous encoded binary bit in the encoded data frame is a 1 and the sequence of binary bits representing a 0 is 11 if the previous encoded binary bit in the encoded data frame is a 0.

6. The galvanic isolator of claim 1 wherein the data decoder comprises a clock that is reset each time a pair of encoded binary bits corresponding to an input binary bit is received by the data decoder.

7. The galvanic isolator of claim 1 wherein the data decoder compares a pair of successive encoded binary bits to determine if those encoded binary bits are equal.

8. The galvanic isolator of claim 7 wherein the data decoder compares the pair of successive encoded bits by detecting a change in state in the encoded data frame in a time period defined by a clock that is reset each time a pair of encoded binary bits corresponding to an input binary bit is received by the data decoder.

9. The galvanic isolator of claim 2 wherein the data decoder compares three successive encoded binary bits to determine if a start frame signal has been received.

10. The galvanic isolator of claim 1 wherein the data transmitter comprises a light source and the data receiver comprises a photodetector.

11. The galvanic isolator of claim 1 wherein the data transmitter comprises an RF transmitter and the data receiver comprises an RF receiver.

12. A galvanic isolator comprising:

a transmitting section and a receiving section, the transmitting section comprising:

a frame input circuit that receives an input data frame comprising a plurality of input binary bits;

a data encoder that receives the input binary bits from the frame input circuit and encodes the input binary bits to generate an encoded data frame comprising a sequence of encoded binary bits in which two successive encoded binary bits represent each input binary bit, the successive encoded binary bits representing a 1 being 01 or 10 and the successive encoded binary bits representing a 0 being 00 or 11, wherein the sequences are chosen to maximize the number of transitions between successive bits having opposite values in the encoded data frame; and a data transmitter that transmits the encoded data frame across an isolation gap that electrically isolates the transmitting section and the receiving section; and the receiving section comprising:

a data receiver that recovers the encoded data frame transmitted by the data transmitter; and a data decoder that examines successive pairs of recovered encoded data bits and generates a recovered output data bit from each of the successive pair of encoded data bits, the data decoder further comprising a first flipflop and a second flipflop, the first flipflop being connected to the second flipflop by at least one XOR gate and a one-shot, where the second flipflop directly receives an output of the at least one XOR gate and an output of the one-shot at its inputs;

wherein the data transmitter comprises one element of a split circuit element and the data receiver comprises a second element of the split circuit element.

13. The galvanic isolator of claim 12 wherein the encoded data frame begins with a start frame signal comprising 0000 or 1111 and wherein the split circuit element comprises a capacitor having a first plate in the transmitting section and a second plate in the receiving section.

14. The galvanic isolator of claim 12 wherein the sequence of the start frame signal is chosen based on an encoded data bit in a previously transmitted encoded data frame and wherein an output of the XOR gate produces a duty cycle of 50% if the encoded data bit corresponds to a first binary value and duty cycle of 75% if the encoded data bit corresponds to a second binary value that is different than the first binary value.

15. The galvanic isolator of claim 12 wherein the encoded data frame comprises an ordered sequence of the encoded binary bits in which each encoded data bit corresponding to one of the input binary bits is immediately preceded by a previously encoded data bit and wherein the sequence of encoded binary bits representing a 1 is 01 if the previously encoded binary bit in the encoded data frame is a 1 and the sequence of binary bits representing a 1 is 10 if the previously encoded binary bit in the encoded data frame is a 0.

16. The galvanic isolator of claim 15 wherein the sequence of encoded binary bits representing a 0 is 00 if the previous encoded binary bit in the encoded data frame is a 1 and the sequence of binary bits representing a 0 is 11 if the previous encoded binary bit in the encoded data frame is a 0.

17. The galvanic isolator of claim 12 wherein the data decoder comprises a clock that is reset each time a pair of encoded binary bits corresponding to an input binary bit is received by the data decoder and wherein the one-shot receives at its input the output of the at least one XOR gate that has been passed through an AND gate which performs an AND operation of the output of the at least one XOR gate with a feedback from the one-shot.

18. The galvanic isolator of claim 12 wherein the data decoder compares a pair of successive encoded binary bits to determine if those encoded binary bits are equal.

19. The galvanic isolator of claim 18 wherein the data decoder compares the pair of successive encoded bits by detecting a change in state in the encoded data frame in a time period defined by a clock that is reset each time a pair of encoded binary bits corresponding to an input binary bit is received by the data decoder.

* * * * *